US012574479B1

US 12,574,479 B1

(12) United States Patent
Rozek et al.

(10) Patent No.: US 12,574,479 B1
(45) Date of Patent: Mar. 10, 2026

(54) VIDEO DOORBELL SYSTEM WITH MODULAR FACEPLATE ACCESSORY

(71) Applicant: AMAZON TECHNOLOGIES, INC., Seattle, WA (US)

(72) Inventors: Grzegorz Rozek, Cracow (PL); Matthew J. England, Santa Monica, CA (US); Oleksii Krasnoshchok, Gdynia (PL); Maksym Yemelin, Gdansk (PL); Artem Kavalerov, Veldhoven (NL); Mikhail Donskoi, Brovary (UA); Serhii Diahlev, Kyiv (UA); Serhiy Borshch, Bucha (UA); Anton Cholpukh, Kyiv (UA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 342 days.

(21) Appl. No.: 18/193,464

(22) Filed: Mar. 30, 2023

(51) Int. Cl.
*H04N 7/18* (2006.01)
*H04L 9/40* (2022.01)
*H04N 7/14* (2006.01)

(52) U.S. Cl.
CPC ......... *H04N 7/186* (2013.01); *H04L 63/0869* (2013.01); *H04N 7/142* (2013.01)

(58) Field of Classification Search
CPC ..... H04N 7/186; H04N 7/142; H04L 63/0869
USPC ...................................................... 348/14.01
See application file for complete search history.

(56) References Cited

U.S. PATENT DOCUMENTS

| | | | | |
|---|---|---|---|---|
| 2016/0314663 A1* | 10/2016 | Glencross | .............. | G03B 29/00 |
| 2020/0073209 A1* | 3/2020 | Fujihashi | ............... | G03B 17/14 |
| 2021/0005036 A1* | 1/2021 | Johnson | .............. | E05B 47/0012 |
| 2021/0174095 A1* | 6/2021 | Kong | ...................... | G06F 3/167 |
| 2022/0254212 A1* | 8/2022 | Schoenfelder | ..... | G07C 9/00904 |
| 2023/0163993 A1* | 5/2023 | Scalisi | ............. | G08B 13/19684 340/5.5 |
| 2025/0106489 A1* | 3/2025 | Wroblewski | ........... | H04N 23/52 |

FOREIGN PATENT DOCUMENTS

CN          212906505 U   *  4/2021

* cited by examiner

*Primary Examiner* — Duc Nguyen
*Assistant Examiner* — Carissa A Jones
(74) *Attorney, Agent, or Firm* — Lindauer Law, PLLC

(57) ABSTRACT

A video doorbell device comprises a main unit with an output device such as a speaker and sensors such as a camera and microphone, as well as a faceplate interface. The faceplate interface includes mechanical and electrical connections. Faceplate accessories may be changed by a user to provide different functionality as needed. A faceplate accessory that is connected to the interface may exchange information with the main unit via the electrical connections. Different faceplate accessories may provide specialized input buttons, additional sensors, area illumination, display devices to show customized messages, and so forth. Some faceplate accessories provide enhanced access control functionality by providing a keypad, fingerprint sensor, or a near-field communication (NFC) interface, and so forth. Communications between the faceplate accessories and the main unit may be secured. The main unit may also detect installation and removal of a faceplate accessory.

20 Claims, 10 Drawing Sheets

Lindauer Law, PLLC

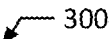

300

I/O INTERFACE(S) 210

SERIAL PERIPHERAL INTERFACE 302

UNIVERSAL SERIAL BUS INTERFACE 304

NEAR FIELD COMMUNICATION INTERFACE 306

•••

OTHER 308

NETWORK INTERFACES 212

LOCAL AREA NETWORK INTERFACE 310

PAN INTERFACE (E.G. BLUETOOTH) 312

•••

OTHER 314

SENSOR(S) 216

ACCESSORY MOUNT SENSOR 320

AMBIENT LIGHT SENSOR 328

MOTION SENSOR 112

TEMPERATURE SENSOR 330

CAMERA (E.G. IR, VISIBLE, UV) 114

ULTRASONIC SENSOR 332

MICROPHONE 118

DEPTH SENSOR 334

TOUCH SENSOR 322

RADAR 336

•••

BUTTON 324

OTHER SENSOR 338

FINGERPRINT SENSOR 326

OUTPUT DEVICE(S) 218

DISPLAY 382

SPEAKER 120

ILLUMINATOR(S) 116

PROJECTOR 384

ACTUATOR 386

SIREN 388

•••

OTHER 392

FIG. 3

430 —
4B00 —
DISPLAY
382
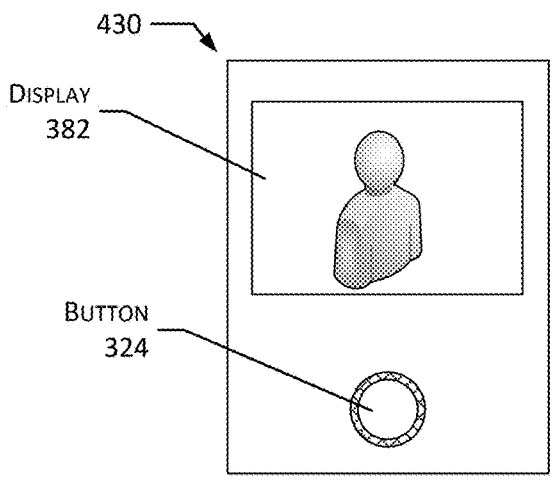
BUTTON
324
432 —
BUTTON
324
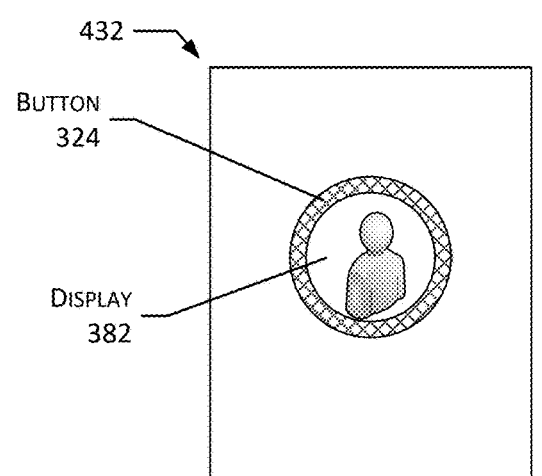
DISPLAY
382
434 —
BUTTON
324
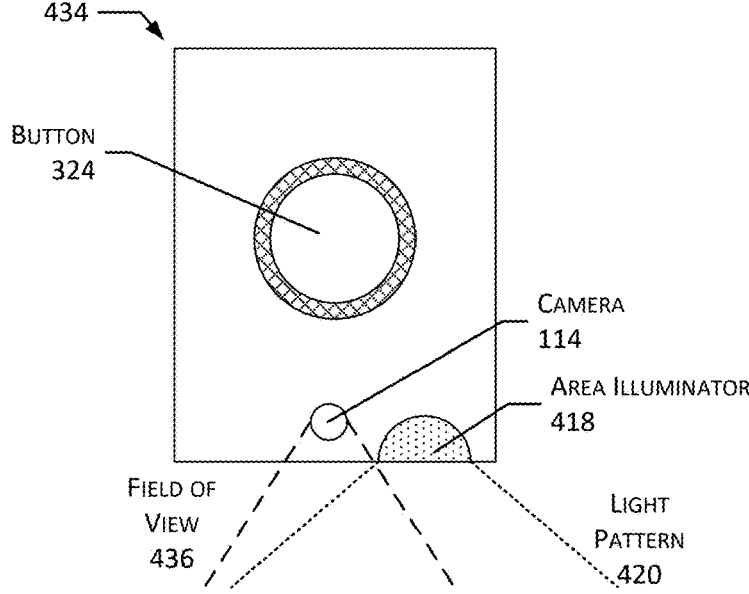
CAMERA
114
AREA ILLUMINATOR
418
FIELD OF
VIEW
436
LIGHT
PATTERN
420
FIG. 4B 4C00
440
BUTTON
324
MATRIX DISPLAY
442
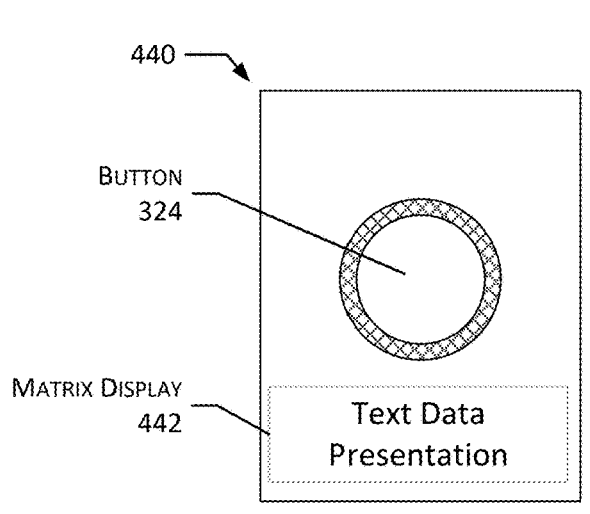
444
ELECTROPHORETIC
DISPLAY
446
TOUCH
SENSOR
322
PROMPTS
448
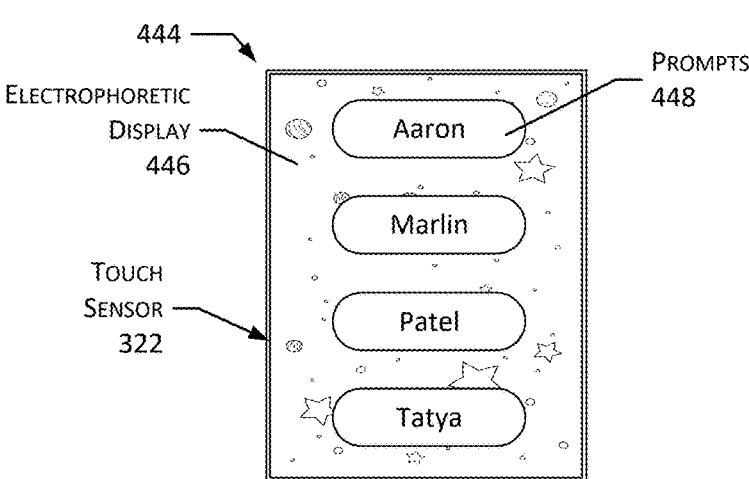
FIG. 4C 460 ⟶
BUTTON
324
NEAR FIELD
COMMUNICATION
INTERFACE
306
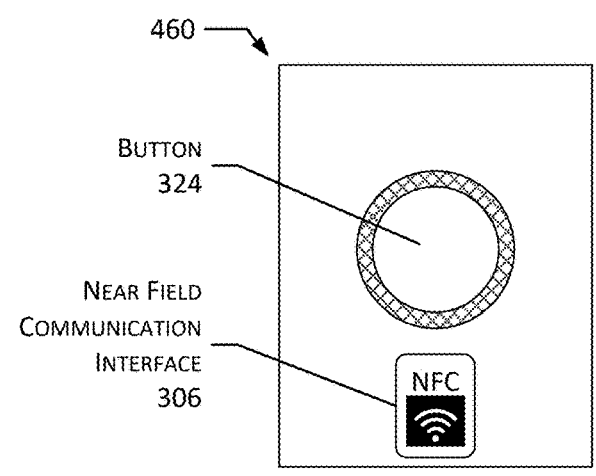
4D00 ⟵
462 ⟶
BUTTON
324
FINGERPRINT
SENSOR
326
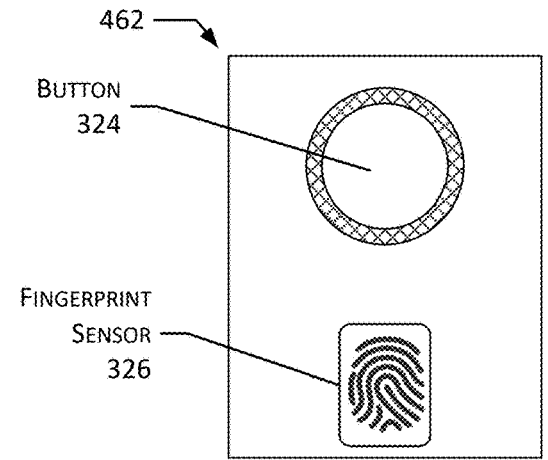
464 ⟶
KEYPAD INDICIA
466
BUTTON INDICIA
468
TOUCH SENSOR
322
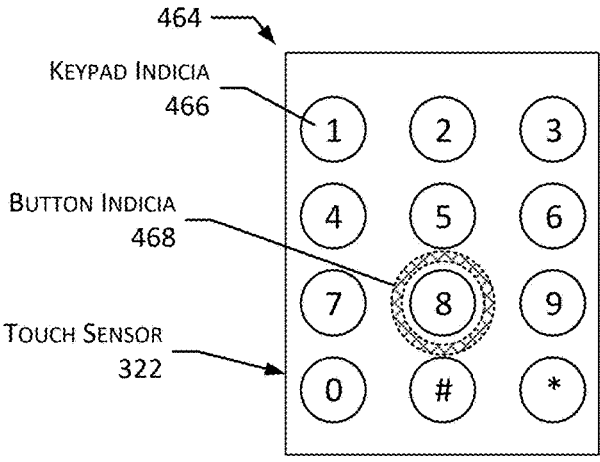
FIG. 4D 570
ENLARGED SIDE VIEW 572 ⟶
FIRST MASK
512
FIRST LIGHT GUIDE
514
COVER 510 ⟶
ILLUMINATOR 116(1)
CIRCUIT BOARD
574
SECOND MASK
516
SECOND LIGHT GUIDE
518
TOUCH SENSOR
322
ILLUMINATOR 116(2)
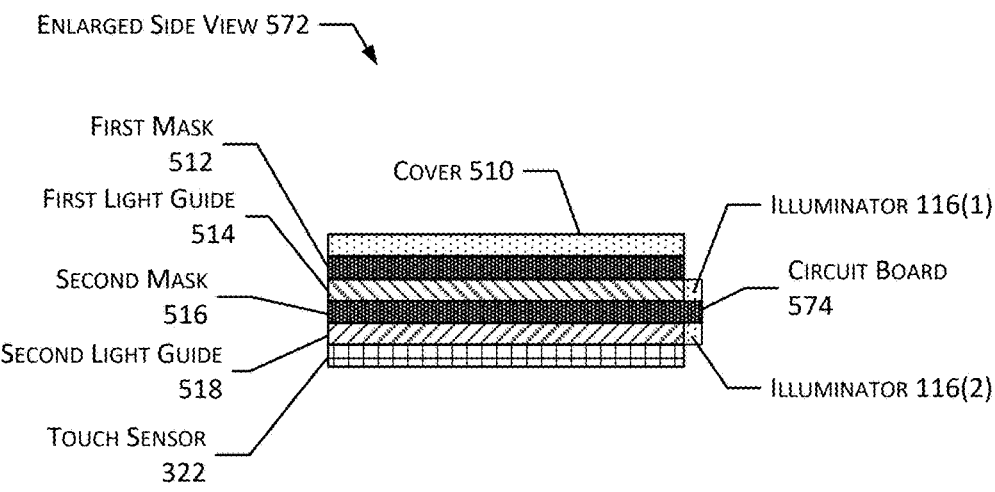
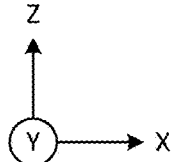
FIG. 5B

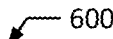

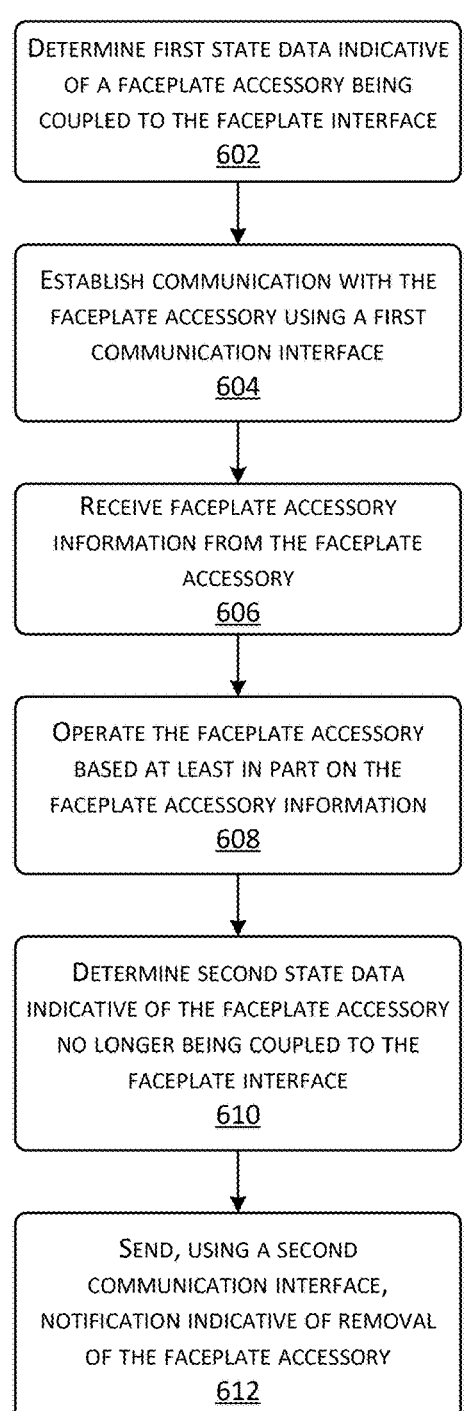

DETERMINE FIRST STATE DATA INDICATIVE OF A FACEPLATE ACCESSORY BEING COUPLED TO THE FACEPLATE INTERFACE
602

ESTABLISH COMMUNICATION WITH THE FACEPLATE ACCESSORY USING A FIRST COMMUNICATION INTERFACE
604

RECEIVE FACEPLATE ACCESSORY INFORMATION FROM THE FACEPLATE ACCESSORY
606

OPERATE THE FACEPLATE ACCESSORY BASED AT LEAST IN PART ON THE FACEPLATE ACCESSORY INFORMATION
608

DETERMINE SECOND STATE DATA INDICATIVE OF THE FACEPLATE ACCESSORY NO LONGER BEING COUPLED TO THE FACEPLATE INTERFACE
610

SEND, USING A SECOND COMMUNICATION INTERFACE, NOTIFICATION INDICATIVE OF REMOVAL OF THE FACEPLATE ACCESSORY
612

FIG. 6

VIDEO DOORBELL SYSTEM WITH MODULAR FACEPLATE ACCESSORY

BACKGROUND

A wide variety of content and services are available to users.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 3 is a block diagram of some components of the system, according to some implementations.

FIGS. 4A, 4B, 4C, and 4D depict various implementations of the faceplate accessory.

FIG. 5B illustrates a second implementation of an assembly that allows selective display of visual indicia such as a keypad at a first time, or a button indicia at a second time.

FIG. 6 is a flow diagram of a process to operate the system, according to some implementations.

Figure 1:
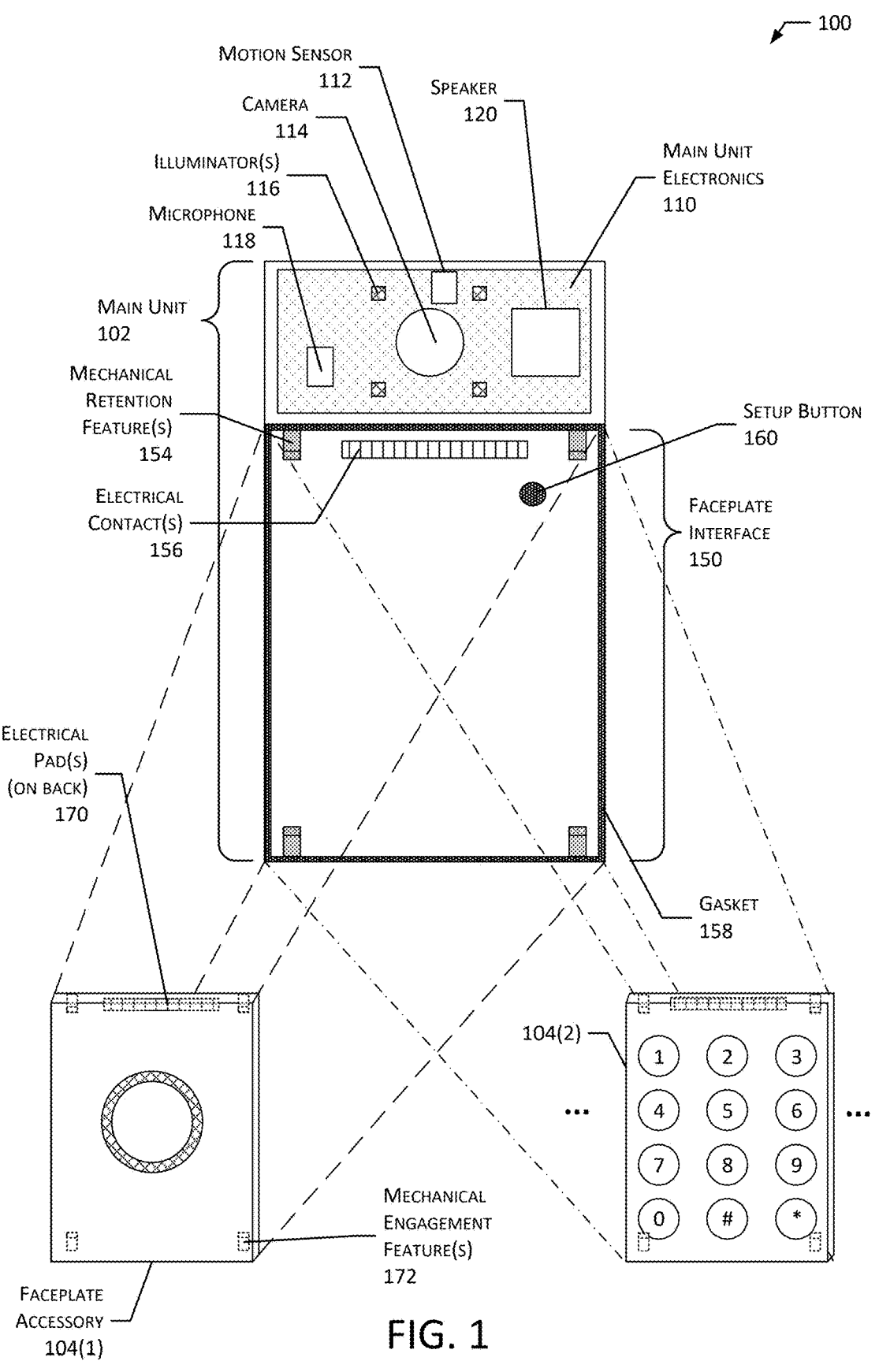
FIG. 1 illustrates a video doorbell system with a modular faceplate accessory, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A video doorbell system may include a camera, microphones, speakers, and motion sensors to detect people near a door of a home, provide notifications to a user such as a homeowner, and allow the user to respond to such notifications.

As described in this disclosure, a user may customize the functionality of their video doorbell to meet their needs or preferences by installing different faceplate accessories. These faceplate accessories may include different hardware, enabling the video doorbell to provide different functions during operation.

In accordance with one or more preferred implementations, a video doorbell system comprises a main unit that includes one or more sensors, one or more output devices, one or more communication interfaces, and a faceplate interface. The faceplate interface allows a user to change a faceplate accessory without having to remove or replace the main unit. This substantially increases the overall flexibility of the video doorbell system.

The faceplate interface includes one or more mechanical retention features that provide a physical connection between the main unit and mechanical engagement features on the faceplate accessory. For example, the mechanical retention features may comprise hooks, latches, slots, pins, and so forth.

The faceplate interface comprises electrical contacts or pads that provide electrical connectivity with corresponding electrical contacts or pads on the faceplate accessory. The electrical contacts allow the main unit to provide electrical power to the faceplate accessory and provide a signal path for a wired communication interface between the main unit and the faceplate accessory.

In some implementations the faceplate accessory may send or receive data. A process to establish a secure connection between the main unit and the faceplate accessory may be implemented. For example, the main unit may authenticate the faceplate accessory, exchange cryptographic keys with the faceplate accessory, and so forth. The secure connection may then be used to send data between the main unit and the faceplate accessory.

Faceplate accessories may be interchangeable, allowing one faceplate accessory to be removed from the faceplate interface of the main unit and another faceplate accessory to be attached to the faceplate interface. For example, a first faceplate accessory that includes a doorbell button may be attached to the faceplate interface. At a later time, the first faceplate accessory may be removed and replaced with a second faceplate accessory that includes a keypad to improve accessibility to the home.

The main unit may detect whether a faceplate accessory is installed or has been removed. This detection may be based on monitoring the connectivity between the electrical contacts and the electrical pads, a switch or sensor in the main unit, and so forth. In the event a faceplate accessory is removed, installed, or both, a notification may be sent from the main unit to another device. For example, a notification may be sent that is then presented on a user device such as a cellphone registered to the user, advising the user of the change. In some implementations, the user device may be used to provide confirmation of the change and allow subsequent operation of the installed faceplate accessory.

Different faceplate accessories may be provided for use, depending upon the needs or preferences of the user. In one embodiment, a faceplate accessory may include light emitting diodes (LEDs) that direct light downward, providing area illumination for an approaching person. In another embodiment a faceplate accessory may include an additional camera that is downward facing to detect objects such as packages delivered to the home. In yet another embodiment a faceplate accessory may include a display device such as a liquid crystal display (LCD), LED display, electronic ink display, and so forth. The display may be used to present information such as an image selected by the user, information such as the names of occupants to allow notifications to be directed to particular users, and so forth.

Other faceplate accessories may provide additional functions. For example, some faceplate accessories may include a fingerprint sensor that acquires an image of a user's fingerprint, a near field communication (NFC) interface to communicate with another device via NFC, and so forth.

The data exchanged to provide these functions may be securely transmitted using the secure connection between the main unit and the accessory.

Another embodiment of a faceplate accessory may include a keypad that may be used to allow entry of a personal identification number (PIN) or password. In one implementation, the faceplate accessory may comprise a multilayer assembly that includes light guides with different visual indicia. A first light guide may include visual indicia such as glyphs of a numeric keypad, while a second light guide includes visual indicia such as a doorbell button icon. By operating an illuminator associated with one of the respective light guides, such as an LED, the assembly may effect display of the keypad or the doorbell button icon. A touch sensor may be included in the assembly to detect user input.

By providing a video doorbell system comprising a main unit with a faceplate interface, the overall functionality of the video doorbell system is expanded. Users may select faceplate accessories to provide desired functionality and easily change the accessory as needed. Users of the system benefit from the enhanced and easily customizable functionality, resulting in an improved overall experience.

Illustrative System

FIG. 1 illustrates a video doorbell system 100, according to some implementations. The video doorbell system 100 comprises a main unit 102 and faceplate accessories 104.

The main unit 102 comprises main unit electronics 110 such as one or more processors. The main unit 102 comprises a first set of sensors such as a motion sensor 112, camera 114 with illuminators 116, and a microphone 118. The main unit 102 may also comprise one or more output devices, such as a speaker 120, and so forth. The electronics, sensors, output devices, and so forth are discussed in more detail with regard to FIGS. 2-3.

The main unit 102 comprises a faceplate interface 150. The faceplate interface 150 includes one or more mechanical retention features 154. The mechanical retention features 154 provide a physical connection between the main unit 102 and corresponding mechanical engagement features 172 on the faceplate accessory 104. For example, the mechanical retention features 154 may comprise hooks, latches, tabs, slots, pins, and so forth. Continuing the example, the mechanical engagement features 172 may comprise hooks, latches, tabs, slots, pins, and so forth. The mechanical retention features 154 and the mechanical engagement features 172 are complementary. For example, the mechanical engagement features 172 may comprise a tab that fits within a slot of the mechanical retention features 154.

The faceplate interface 150 of the main unit 102 also comprises electrical contacts 156 that provide electrical connectivity with corresponding electrical pads 170 on the faceplate accessory 104. The electrical contacts 156 may comprise one or more of spring contacts, pogo pins, and so forth. The electrical contacts 156 allow the main unit 102 to provide electrical power to the faceplate accessory 104 engaged with the faceplate interface 150. The electrical contacts 156 may also provide a signal path for a wired communication interface between the main unit 102 and the faceplate accessory 104.

The faceplate interface 150 may include a gasket 158 around the perimeter. When the faceplate accessory 104 is mechanically engaged within the faceplate interface 150 by the mechanical retention features 154, the gasket 158 provides a seal between the faceplate accessory 104 and the main unit 102. This gasket 158 may prevent contaminants from entering the main unit 102.

In some implementations the main unit 102 may include a setup button 160. The setup button 160 may be disposed within the faceplate interface 150 such that the setup button 160 is exposed when the faceplate accessory 104 is removed or is concealed behind the faceplate accessory 104 when the faceplate accessory 104 is installed. The setup button 160 may be used to provide input to the main unit 102 that faceplate accessory 104 installation in imminent. For example, a user may press the setup button 160 to begin a pairing process using the wired communication interface between the main unit 102 and the faceplate accessory 104 that will be subsequently installed.

Also depicted in FIG. 1 are two examples of faceplate accessories 104(1) and 104(2). As mentioned above, each faceplate accessory 104 may comprise mechanical engagement features 172 and electrical pads 170. In this figure, a first faceplate accessory 104(1) may comprise a doorbell button and a second faceplate accessory 104(2) may comprise a keypad. These and other implementations of faceplate accessories 104 are discussed with regard to FIGS. 4A-4D and FIGS. 5A-5B.

In this figure the sensors and output devices of the main unit 102 are located above the faceplate interface 150. In other implementations other configurations may be used. For example, one or more of the sensors or the output devices may be located to the left of, to the right of, below, or disposed around the faceplate interface 150.

Figure 2:
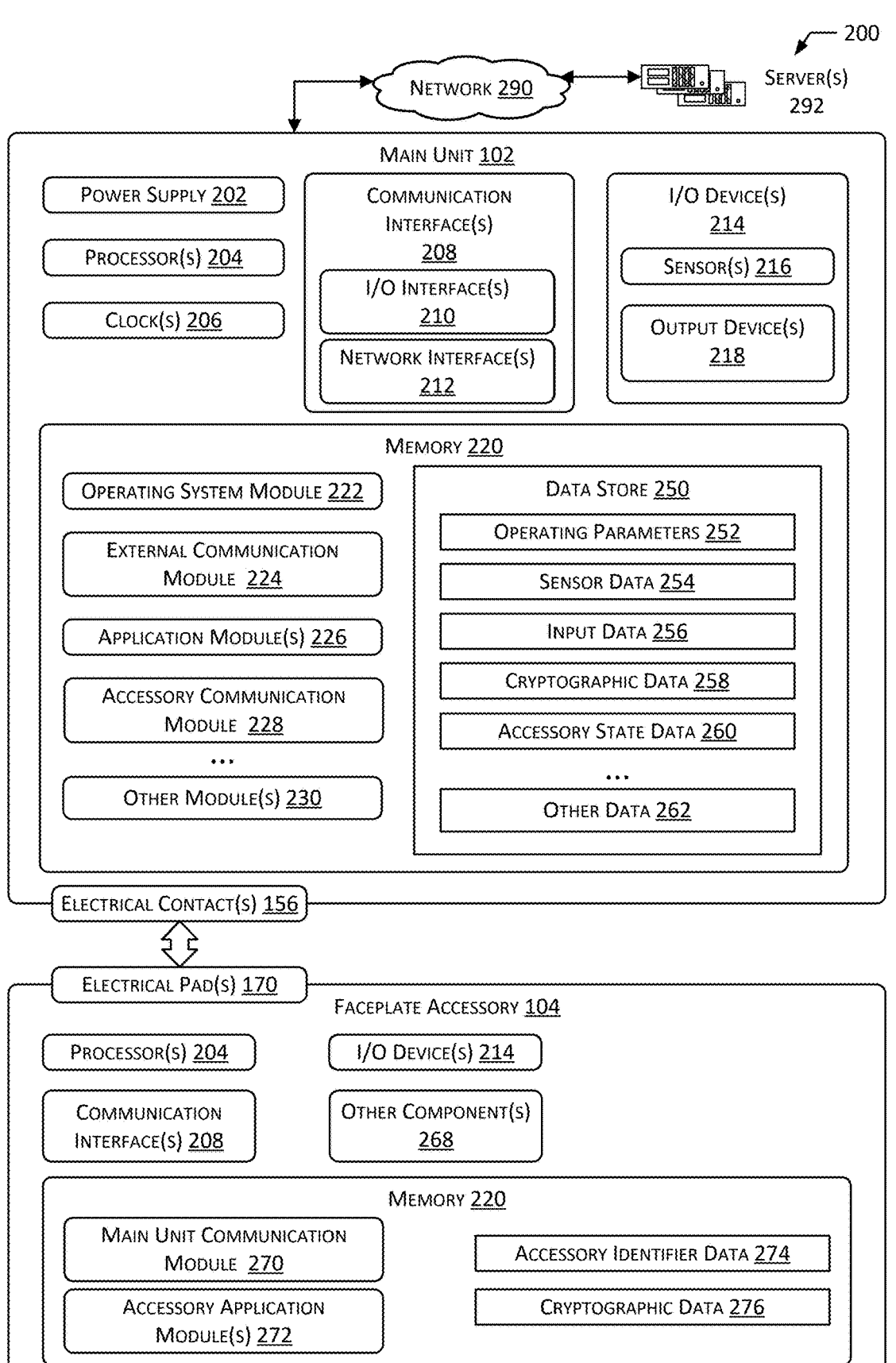
FIG. 2 is a block diagram of the system, according to some implementations.
Figure 4A:
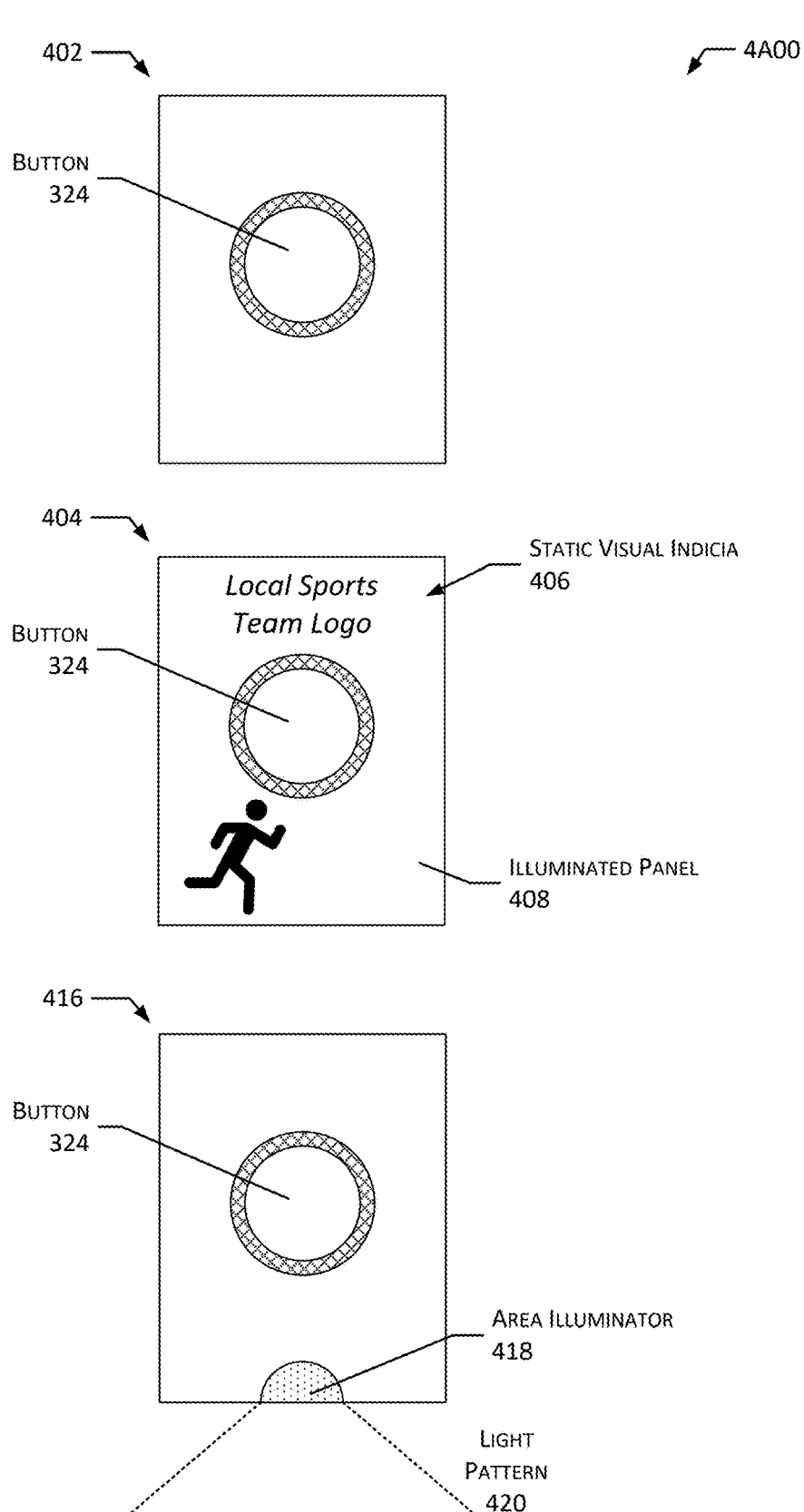

FIG. 2 is a block diagram 200 of the system 100, according to some implementations.

The main unit 102 may include a power supply 202 to provide electrical power to operate the various components in the main unit 102. For example, the power supply 202 may convert alternating current obtained from a utility line to one or more voltages. In another implementation the power supply 202 may comprise a battery.

The main unit 102 may include one or more hardware processors 204 configured to execute one or more stored instructions. The processors 204 may comprise one or more cores. The processors 204 may include microcontrollers, systems on a chip, field programmable gate arrays, digital signal processors, graphic processing units, image signal processors, coprocessors, general processing units, application specific integrated circuits, and so forth.

One or more clocks 206 may provide information indicative of date, time, ticks, and so forth. For example, the processors 204 may use data from the clock 206 to associate a particular time with an action, sensor data 254, and so forth.

The main unit 102 may include one or more communication interfaces 208 such as input/output (I/O) interfaces 210, network interfaces 212, and so forth. The communication interfaces 208 enable the main unit 102, or components thereof, to communicate with other devices or components. The communication interfaces 208 may include one or more I/O interfaces 210. The I/O interfaces 210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 210 may couple to one or more I/O devices 214. The I/O devices 214 may include input devices such as one or more sensors 216. The I/O devices 214 may also include output devices 218. In some embodiments, the I/O devices 214 may be physically incorporated with the main unit 102 or may be externally placed. The I/O devices 214 are discussed in more detail with regard to FIG. 3.

The network interfaces 212 may be configured to provide communications between the main unit 102 and other devices such as other apparatuses, content servers, routers, access points, servers, and so forth. The network interfaces 212 may include devices configured to couple to personal area networks (PANs), local area networks (LANs), wireless local area networks (WLANs), wide area networks (WANs), and so forth. For example, the network interfaces 212 may include devices compatible with Ethernet, Wifi, Bluetooth, Bluetooth Low Energy, ZigBee, Lora, and so forth. The main unit 102 may also include one or more buses or other internal communications hardware or software that allow for the transfer of data between the various modules and components of the main unit 102.

As shown in FIG. 2, the main unit 102 includes one or more memories 220. The memory 220 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the main unit 102. A few example functional modules are shown stored in the memory 220, although the same functionality may alternatively be implemented in hardware, firmware, or as a system on a chip (SoC).

The memory 220 may include at least one operating system (OS) module 222. The OS module 222 is configured to manage hardware resource devices such as the communication interfaces 208, the I/O devices 214, and provide various services to applications or modules executing on the processors 204. The OS module 222 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 220 may be a data store 250 and one or more of the following modules. These modules may be executed as foreground applications, background tasks, daemons, and so forth. The data store 250 may use a flat file, database, linked list, tree, executable code, script, or other data structure to store information. The data store 250 may store one or more of operating parameters 252, sensor data 254, input data 256, cryptographic data 258, accessory state data 260, or other data 262.

The operating parameters 252 may specify one or more thresholds, limits, or preferences associated with operation of the system 100. For example, the operating parameters 252 may specify a distance threshold for proximity detection, specified frame rate for acquisition of video by the camera 114, and so forth.

The sensor data 254 may comprise data acquired during operation of one or more of the sensors 216 or I/O interfaces 210. For example, the sensor data 254 may comprise image data acquired by a camera 114, data received from a near-field communication interface, and so forth.

The input data 256 may comprise data indicative of user input. In some implementations the input data 256 may be based on sensor data 254. For example, sensor data 254 provided by a touch sensor controller may indicate a touch at particular coordinates with respect to the touch sensor. Based on the coordinates, input data 256, such as a "doorbell push" or entry of a numeric value such as a "1" displayed on a keypad may be determined.

The cryptographic data 258 may comprise information such as public keys, private keys, symmetric keys, and so forth. The cryptographic data 258 may be used by one or more of the application module(s) 226, external communication module 224, the accessory communication module 228, and so forth to cryptographically secure data for storage, transmission, for authentication, and so forth. In some implementations the cryptographic data 258 may be stored within a secure compute environment (SCE). The SCE may include one or more anti-tamper devices. In the event the one or more anti-tamper devices detect tampering, mitigating actions may be taken. For example, memory within the SCE may be erased, the SCE may be rendered inoperable, and so forth.

The accessory state data 260 provides information indicative of whether the faceplate accessory 104 is installed or not. In some implementations the accessory state data 260 may comprise information about the faceplate accessory 104 such as the serial number, make, model, features available, whether the faceplate accessory 104 has been authenticated, whether the faceplate accessory 104 has reported a fault, and so forth.

The other data 262 may comprise system maintenance logs, error handling information, and so forth.

In some implementations, the data store 250 or a portion of the data store 250 may be distributed across one or more other devices, servers, network attached storage devices, and so forth.

An external communication module 224 may be configured to establish communication with other devices, such as other main units 102, an external server 292 via network 290, and so forth. The communications may be authenticated, encrypted, and so forth.

One or more application modules 226 may provide various functionality. For example, an application module 226 may receive data or a signal from the faceplate accessory 104 that is indicative of actuation of a doorbell button of the faceplate accessory 104. Responsive to this data or signal, the application module 226 may determine occurrence of a doorbell input event. The application module 226 may then use the external communication module 224 to send data indicative of the doorbell input event to an external device, such as the servers 292, a user device, and so forth. The same or another application module 226, responsive to the doorbell input event, may operate the camera 114 to acquire video data that may then be sent to the external device using the external communication module 224. In another example, the application module 226 may acquire input from a keypad of the faceplate accessory 104. Based on the input, the application module 226 may send a command to perform an action, such as operating an electronic lock to unlock a door.

In some implementations, an application module 226 may send data or a signal using the accessory communication module 228 to transition the faceplate accessory 104 from a first operating mode to a second operating mode, in which the second operating mode consumes more electrical power than the first operating mode. For example, the motion sensor 112 of the main unit 112 may generate sensor data 254 indicative of motion. Responsive to this, the application module 226 may send a signal or command to the faceplate accessory 104 to "wake up" from a low power mode.

An accessory communication module 228 may be configured to provide communication between the main unit 102 and the faceplate accessory 104. The communications between the main unit 102 and the faceplate accessory 104 may be authenticated, encrypted, and so forth.

In some implementations, the accessory communication module 228 may utilize the Constrained Applications Protocol ("CoAP") such as specified by RFC 7252 as promulgated by the Internet Engineering Task Force ("IETF"). In some implementations, data transferred between the accessory communication module 228 and a main unit communication module 270 of the faceplate accessory 104 may be serialized using the Concise Binary Object Representation ("CBOR") such as specified by RFC 8152 of the IETF. CBOR Object Signing and Encryption ("COSE") may be used to provide end-to-end protection between the main unit 102 and the faceplate accessory 104 that are communicating using CoAP. COSE is specified by RFC 8613 of the IETF. In other implementations, other protocols and techniques may be used to secure communication between the main unit 102 and the faceplate accessory 104.

In some implementations, an authentication process may be used to provide assurance that the faceplate accessory 104 is suitable to be in communication with the main unit 102. In one implementation, the authentication process may utilize an Ephemeral Diffie-Hellman Over COSE ("ED-HOC"). A working internet-draft of EDHOC is promulgated by IETF. EDHOC may be used to provide for mutual authentication between the main unit 102 and the faceplate accessory 104. Once authenticated, COSE may be used to establish a secure connection between the main unit 102 and the faceplate accessory 104. CBOR may be used for encoding data for communication, and CoAP may be used for transport layer control.

In some implementations, the wired communication interface between the main unit 102 and the faceplate accessory 104 may utilize an SPI I/O interface 210. In other implementations, other interfaces may be used, such as USB. While a wired communication interface is described, in other implementations other techniques may be used. For example, an optical communication system may use LEDs and photodetectors to send and receive data between the main unit 102 and the faceplate accessory 104 using infrared light. In another example, a radio-frequency (RF) transceiver may be used to establish communication between the main unit 102 and the faceplate accessory 104. Combinations of techniques may also be used. For example, an electrical connection may be used to send an interrupt signal, while data is transferred using an optical communication system.

In some implementations unidirectional communication may be utilized. For example, the main unit 102 may only send data and the faceplate accessory 104 may only receive data. Contrariwise, the faceplate accessory 104 may only send data and the main unit 102 may only receive data.

With respect to the faceplate accessory 104, the system 100 may utilize various configurations. In the implementation depicted, the faceplate accessory comprises the electrical pads 170, one or more processors 204, memory 220, one or more communication interfaces 208, one or more I/O devices 214, such as described above and with regard to FIG. 3. The faceplate accessory 104 may also comprise other components 268. For example, the faceplate accessory 104 may comprise a photovoltaic cell, a battery, a compartment that may be locked or unlocked subject to operation of the system 100, and so forth.

The memory 220 of the faceplate accessory 104 may store a main unit communication module 270 configured to provide communication between the main unit 102 and the faceplate accessory 104. As described above, the communications between the main unit 102 and the faceplate accessory 104 may be authenticated, encrypted, and so forth.

The memory 220 of the faceplate accessory 104 may store one or more accessory application modules 272 that provide various functionality associated with the faceplate accessory 104. For example, an accessory application module 272 may process sensor data 254 from a sensor 216 onboard the faceplate accessory 104 and determine input data 256.

The memory 220 of the faceplate accessory 104 may store accessory identifier data 274. The accessory identifier data 274 may comprise one or more of a serial number, model number, device type, and so forth that is associated with the faceplate accessory 104. In some implementations at least a portion of the accessory identifier data 274 may comprise cryptographic data 276.

Similar to the cryptographic data 258 described above, the cryptographic data 276 at the faceplate accessory 104 may comprise information such as public keys, private keys, symmetric keys, and so forth. The cryptographic data 276 may be used by one or more of the main unit communication module 270, the accessory application module(s) 272, and so forth to cryptographically secure data for storage, transmission, authentication, and so forth. In some implementations the cryptographic data 276 may be stored within an SCE.

The memory 220 of the faceplate accessory 104 may store other data, not illustrated in this figure. For example, sensor data 254 acquired using the sensors 216 of the faceplate accessory 104, output data for presentation using one or more output devices 218, and so forth may be stored.

During operation, the main unit 102 may use one or more techniques to determine if the faceplate accessory 104 is installed within the faceplate interface 150. For example, one or more of the operating system module 222 or the application module 226 may determine the accessory state data 260.

In one implementation, the main unit 102 may use information associated with the electrical contacts 156 to determine the presence or absence of the faceplate accessory 104 or information about the faceplate accessory 104. For example, circuitry may determine the faceplate accessory 104 has been installed or removed based on a change in one or more electrical characteristics with respect to the electrical contacts 156. For example, if a loss of continuity or deviation from a specified electrical resistance that would otherwise be expected between two or more of the electrical contacts 156 is detected, the faceplate accessory 104 may be deemed to have been removed. In some implementations, one or more electrical characteristics as measured between two or more of the electrical contacts 156 may be used to determine information about the faceplate accessory 104, if any. For example, determination of continuity or a particular electrical resistance between particular electrical contacts 156 may be determined using electronics in the main unit 102. Particular combinations of electrical characteristics may be used to specify a particular class, model, or other grouping of faceplate accessory 104. For example, if the electrical characteristics indicate continuity between electrical contacts 156(1) and 156(3) and a 10 kilohm resistance between electrical contacts 156(1) and 156(2), a faceplate accessory 104 consisting of a button may be determined. In comparison, if the electrical characteristics indicate 5 kilohm resistance between electrical contacts 156(1) and 156(3) and a 45 kilohm resistance between electrical contacts 156(1) and 156(2), a faceplate accessory 104 may be determined to contain an SPI communication interface. By determining the electrical characteristics and comparing to previously stored data, such as a lookup table in the memory 220, the main unit 102 may determine information about the faceplate accessory 104 that is attached to the faceplate interface 150.

In another example, the main unit 102 may include an accessory mount sensor 320 that provides output indicative of the presence or absence of the faceplate accessory 104. The accessory mount sensor 320 is discussed in more detail below with regard to FIG. 3.

The main unit 102 may operate responsive to the determination of the accessory state data 260. For example, upon detection of a change in state indicating installation of a faceplate accessory 104 in the faceplate interface 150, the accessory communication module 228 may attempt to establish communication and authenticate the faceplate accessory 104. In another example, upon detection of a change in state indicating removal of the faceplate accessory 104 from the faceplate interface 150, the external communication module 224 may send a notification indicative of the removal to an external device such as the servers 292, to a user device associated with the system 100, and so forth. For example, the main unit 102 may use the network 290, such as the internet, to communicate with the servers 292.

In some implementations the main unit 102 may receive data via the external communication module 224 before removal of the faceplate accessory 104. For example, the user may use a user device to send a command, such as via the server 292, that the accessory device 104 is to be removed. Responsive to this, the main unit 102 may perform various operations such as discontinuing the secure communication with the faceplate accessory 104, operating an actuator 386 to mechanically release mechanical retention features 154 and thus release the faceplate accessory 104 for removal, and so forth.

In some implementations, if the faceplate accessory 104 is removed without confirmation from an approved external device, a siren 388 or other output device 218 may be used to present an alarm.

Modules described herein, may provide various processing functions such as de-noising, filtering, and so forth. Processing of sensor data 254, such as image data from a camera 114, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; and Willow Garage of Menlo Park, California, USA. In another implementation, functions available in the OKAO machine vision library as promulgated by Omron Corporation of Kyoto, Japan, may be used to process the sensor data 254. In still another implementation, functions such as those in the Machine Vision Toolbox (MVTB) available using MAT-LAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 254 or other data 262. For example, the ANN may be trained using a supervised learning algorithm such that object identifiers are associated with images of particular objects within training images provided to the ANN. Once trained, the ANN may be provided with the sensor data 254 and produce output indicative of the object identifier.

In some implementations the faceplate accessory 104 may omit one or more of the components described above. For example, the faceplate accessory 104 may omit a processor 204, memory 220, and so forth. The communication interface 208 may comprise circuitry to generate or direct signals to one or more of the electrical pads 170. For example, actuation of a button 324 may set one of the electrical pads 170, and corresponding electrically connected electrical contacts 156 from a low to a high voltage, providing a signal indicative of the actuation of the button 324.

One or more of the main unit 102 or the faceplate accessory 104 may include tamper detection devices. For example, a tamper detection mesh may be used to detect and disable one or more of the main unit 102, the faceplate accessory 104, in the event of a physical intrusion with respect to one or more portions of those devices. In some implementations, if tampering is detected, one or more mitigating actions may be taken. For example, detection of a break in a tamper detection mesh may result in erasure of the memory 220 or a portion thereof. In another example, detection of tampering may result in overloading one or more fusible links.

FIG. 3 is a block diagram 300 of some components of one or more of the main unit 102, the faceplate accessory 104, or both, according to some implementations. The components illustrated here are provided by way of illustration and not necessarily as a limitation. For example, the main unit 102 or the faceplate accessory 104 may utilize a subset of the particular I/O interfaces 210, network interfaces 212, sensors 216, or output devices 218, or may utilize components not pictured.

The I/O interfaces 210 may include a Serial Peripheral Interface (SPI) bus 302, Universal Serial Bus (USB) interface 304, near field communication (NFC) interface 306, or other 308 interface.

The NFC interface 306 may be compliant with at least a portion of promulgated standards such as ISO/IEC 14443, ISO/IEC 18092, and so forth.

The network interfaces 212 may include one or more of a local area network interface 310, a PAN interface 312, or other interfaces 314. The local area network interface 310 may be compliant with at least a portion of the Wi-Fi specification. For example, the local area network interface 310 may be compliant with at least a portion of the IEEE 802.11 specification as promulgated by the Institute of Electrical and Electronics Engineers (IEEE). The PAN interface 312 may be compliant with at least a portion of one or more of the Bluetooth, wireless USB, Z-Wave, ZigBee, or other standards. For example, the PAN interface 312 may be compliant with the Bluetooth Low Energy (BLE) specification.

In another example, the other 314 network interface may comprise a wireless wide area network (WWAN) interface or a wireless cellular data network interface. Continuing the example, the other 314 network interface may be compliant with at least a portion of the LTE, 5G, or other standards.

The other 308 I/O interfaces, the other 314 network interfaces, or both may include other equipment to send or receive data using other wavelengths or phenomena. For example, an ultrasonic transceiver may be used to send data as ultrasonic sounds, an optical communication system may communicate by modulating a light source such as a light-emitting diode and detecting that light using a photodetector, and so forth.

The system 100 may include one or more of the following sensors 216. The sensors 216 depicted here are provided by way of illustration and not necessarily as a limitation. It is understood that other sensors 216 may be included or utilized by the system 100, while some sensors 216 may be omitted in some configurations.

An accessory mount sensor 320 provides sensor data 254 indicative of a placement of the faceplate accessory 104 with respect to the faceplate interface 150. The accessory mount sensor 320 may comprise one or more of a switch, optical sensor, Hall effect device, magnetic reed switch, capacitive switch, pair of electrical contacts that are subsequently connected upon installation of the faceplate accessory 104, and so forth.

The motion sensor 112 is configured to detect an object. The motion sensor 112 may detect movement of, presence of, or proximity of an object such as a person that is within the field of view of the motion sensor 112. In some implementations the motion sensor 112 may comprise an optical emitter and an optical detector. An object may be determined based on the reflectance by the object of a signal emitted by the optical emitter as detected by the optical detector. In other implementations, other techniques may be used. For example, the motion sensor 112 may utilize ultrasound, radar, image data acquired by a camera 114, and so forth.

In accordance with one or more preferred implementations, a main unit 102 comprises one or more passive infrared (PIR) sensors. In accordance with one or more preferred implementations, a main unit 102 comprises one or more Fresnel lenses disposed over one or more PIR sensors, with the one or more Fresnel lenses being shaped, dimensioned, and configured to direct light onto the one or more PIR sensors.

In accordance with one or more preferred implementations, a main unit 102 comprises a radar 336 sensor utilizing frequency modulated continuous wave radar.

A camera 114 generates sensor data 254 indicative of one or more images. The camera 114 may be configured to detect light in one or more wavelengths including, but not limited to, terahertz, infrared, visible, ultraviolet, and so forth. For example, an infrared camera 114 may be sensitive to wavelengths between approximately 700 nanometers and 1 millimeter. The camera 114 may comprise charge coupled devices (CCD), complementary metal oxide semiconductor (CMOS) devices, microbolometers, and so forth. The system 100 may use image data acquired by the camera 114 for object recognition, user communication, and so forth. The camera 114 may be used to acquire visible light, infrared, or other imagery.

The microphone 118 may be used to acquire sensor data 254 representative of sound present in the environment. In some implementations a plurality of microphones 118 may be arranged in an array. These arrays may implement beamforming techniques to provide for directionality of gain.

The touch sensor 322 may be used to accept touch input. The touch sensor 322 may utilize a force sensitive touch sensor, a capacitive touch sensor, an optical touch sensor, an ultrasonic touch sensor, an interpolating force sensitive resistor sensor, and so forth. The touch sensor 322 may comprise a touch sensor element and a touch sensor controller. The touch sensor controller may operate the touch sensor element to determine sensor data 254 indicative of one or more touches on the touch sensor.

One or more buttons 324 or switches allow sensor data 254 indicative of manual input. The buttons 324 or switches may comprise mechanical switches, electronic switches, capacitive switches, and so forth.

A fingerprint sensor 326 may comprise one or more of an imaging device, capacitive sensor, resistive sensor, or other device to acquire sensor data 254 indicative of one or more features associated with a user's fingerprint.

An ambient light sensor 328 may comprise one or more photodetectors or other light-sensitive elements that are used to determine sensor data 254 indicative of one or more of the color, intensity, or duration of ambient lighting.

A temperature sensor 330 may be utilized to provide sensor data 254 indicative of temperature of the ambient environment or a portion of the system 100. For example, the temperature sensor 330 may comprise a thermistor.

An ultrasonic sensor 332 determines sensor data 254 using sounds in excess of 20 kHz to determine a distance from the sensor 216 to an object. The ultrasonic sensor 332 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 332 may provide information indicative of a presence of an object, distance to the object, and so forth. Two or more ultrasonic sensors 338 may be utilized in conjunction with one another to determine a location within a two-dimensional plane of the object.

In some implementations, the ultrasonic sensor 332 or a portion thereof may be used to provide other functionality. For example, the emitter of the ultrasonic sensor 332 may be used to transmit data and the detector may be used to receive data transmitted that is ultrasonic sound. In another example, the emitter of an ultrasonic sensor 332 may be set to a particular frequency and used to generate a particular waveform such as a sawtooth pattern to provide a signal that is audible to an animal, such as a dog or a cat.

A depth sensor 334 may provide sensor data 254 indicative of one or more of a presence or absence of an object, a distance to the object, or characteristics of the object. The depth sensor 334 may use time of flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The depth sensor 334 may utilize one or more sensing elements.

In another implementation, a structured light pattern may be provided by the optical emitter. A portion of the structured light pattern may then be detected on the object using a sensor 216 such as an image sensor or camera 114. Based on an apparent distance between the features of the structured light pattern, the distance to the object may be calculated.

In another implementation, the depth sensor 334 may use a coded aperture to determine sensor data 254 indicative of distance. In yet another implementation, a variable focus technique may be used to determine distance. With this technique, the focus of a camera 114 is changed. Based on the blurriness or sharpness of a particular portion and given information about focus settings, a distance to an object may be determined.

In other implementations, other techniques may also be used to determine distance to the object. In some implementations, the depth sensor 334 may operate as a depth camera, providing a two-dimensional image of a scene, as well as data that indicates a distance to each pixel.

The sensors 216 may include a radar 336. The radar 336 may be used to provide sensor data 254 indicative of presence or absence, distance, lateral position, and so forth, to an object. In some implementations, the radar 336 may operate at 24 GHz.

The system 100 may include other sensors 338 as well. For example, the other sensors 338 may include one or more of the following. An inertial measurement unit (IMU) may comprise a prepackaged solid state unit that comprises one or more gyrometers, accelerometers, and so forth. In other implementations, discrete components, such as a discrete accelerometer may be used. The sensors 216 may include a passive infrared (PIR) sensor. The PIR sensor may determine sensor data 254 that is indicative of the presence of users, pets, and so forth. For example, the PIR sensor may be configured to detect infrared radiation with wavelengths between 8 and 14 micrometers.

The system 100 includes one or more output devices 218.

A display 382 may comprise one or more of a liquid crystal display, LED display, electrophoretic display 446 (also known as an eink display), cholesteric liquid crystal display, interferometric display, and so forth. The display 382 may be used to present visible information such as graphics, pictures, text, and so forth. In some implementations, the display 382 may comprise a touchscreen that combines the touch sensor 322 and the display 382. A display controller may comprise electronics that operate the display 382 to present output.

In some implementations the display 382 may comprise a matrix display 442. The matrix display 442 may comprise one or more elements that when operated present information. For example, the matrix display 442 may comprise a set of segments, icons, dots, and so forth.

The speakers 120 emit sound. For example, the speakers 120 may be used to present an audio file, present speech from a remote user, and so forth.

The illuminators 116 may be used to emit photons during operation. The illuminator 116 may comprise an LED, quantum dot device, electroluminescent device, fluorescent device, incandescent lamp, and so forth. In some implementations, the illuminators 116 may be used to provide illumination for operation of other devices, such as the camera 114. In other implementations, the illuminators 116 may be used to present output to the user, such as presenting a particular color of light to indicate an operation. In still other implementations the illuminators 116 may be used to provide area lighting for users. The illuminators 116 may emit one or more of infrared, visible, or ultraviolet light. For example, some illuminators 116 may operate as infrared light sources.

In some implementations, the main unit 102 may be equipped with a projector 384. For example, the projector 384 may comprise an illuminator 116 and a microelectromechanical system (MEMS) mirror or other devices. The projector 384 may be able to project an image on a surface, such as a floor, wall, ceiling, and so forth.

The system 100 may include one or more actuators 386. The actuators 386 may comprise an electrically operated mechanism such as one or more of a motor, solenoid, piezoelectric material, electroactive polymer, shape-memory alloy, and so forth. An actuator controller may be used to provide a signal or other input that operates one or more of the actuators 386 to produce movement of a moveable component. In one implementation, the actuator(s) 386 may be used to lock or unlock the faceplate accessory 104 with respect to the faceplate interface 150. In another implementation, the actuator(s) may operate a locking mechanism associated with a door, window, shutter, and so forth.

The system 100 may include one or more sirens 388. The siren 388 may be used to emit a high amplitude audible signal to elicit attention from bystanders.

The system 100 may also include other output devices 392.

FIGS. 4A-4D depict various implementations of faceplate accessories 104.

A first implementation 402 depicts the faceplate accessory 104 comprising a button 324 mounted in a housing. Upon actuation of the button 324 a signal or data based on the signal may be sent from the faceplate accessory 104 to the main unit 102. Responsive to the signal or data, an application module 226 may operate the main unit 102 to perform one or more operations. For example, the application module 226 may send data indicative of the actuation to the server 292 using the external communication module 224.

A second implementation 404 depicts the faceplate accessory 104 comprising a button 324 mounted in a housing. A portion of the housing may comprise a static visual indicia 406. For example, the static visual indicia 406 may comprise a logo or icon associated with a preferred sports team, academic institution, or other organization. In some implementations the static visual indicia 406 may be illuminated by an illuminated panel 408. For example, the illuminated panel 408 may comprise a light guide and one or more illuminators 116 that backlight the static visual indicia 406.

A third implementation 416 depicts the faceplate accessory 104 comprising a button 324 mounted in a housing and an area illuminator 418. The area illuminator 418 may comprise one or more illuminators 116. During operation, the area illuminator 418 emits light in a light pattern 420. The light pattern 420 may be directed generally downwards, such that the ground in the immediate vicinity of the system 100 is illuminated. For example, the area illuminator 418 may serve to illuminate the area near the system 100 at night. The area illuminator 418 may be operated by the main unit 102. For example, the main unit 102 may send electrical power to one or more electrical contacts 156 that are in electrical contact with one or more electrical pads 170 that are connected to the one or more illuminators 116.

A fourth implementation 430 depicts the faceplate accessory 104 comprising a button 324 mounted in a housing with a display 382. For example, the display 382 may comprise an organic LED (OLED) display, LCD display, and so forth. The display 382 may be operated based on data received from the main unit 102 via the communication interface 208 with the main unit 102. For example, the main unit 102 may send a still image or video data to the faceplate accessory 104 for presentation using the display 382 using a secure connection.

A fifth implementation 432 depicts the faceplate accessory 104 comprising a button 324 mounted in a housing. A display 382 is located within a perimeter of the button 324. The display 382 may be operated based on data received from the main unit 102 via the communication interface 208 with the main unit 102. For example, the main unit 102 may send a still image or video data to the display 382 in the faceplate accessory 104 using a secure connection.

A sixth implementation 434 depicts the faceplate accessory 104 comprising a button 324 mounted in a housing, an area illuminator 418, and a second camera 114. As described above, during operation the area illuminator 418 emits light in a light pattern 420. The light pattern 420 may be directed generally downwards, such that the ground in the immediate vicinity of the system 100 is illuminated. For example, the area illuminator 418 may serve to illuminate the area near the system 100 at night. In some implementations the area illuminator 418 may be omitted.

The second camera 114 has a field of view (FOV) 436. In the implementation depicted here, the FOV 436 is directed downward. For example, the FOV 436 may provide a view of the portion of the ground that is illuminated by the area illuminator 418 during operation. In other implementations, the FOV 436 may be directed in other directions.

The second camera 114 may be operated by the main unit 102. For example, the main unit 104 may send instructions to activate the second camera 114. Responsive to this, the second camera 114 may then send image data to the main unit 102 using a secure connection.

A seventh implementation 440 depicts the faceplate accessory 104 comprising a button 324 mounted in a housing and a matrix display 442. The matrix display 442 may be operated based on data received from the main unit 102 via the communication interface 208 with the main unit 102. For example, the matrix display 442 may be used to present information such as instructions, name of a resident, and so forth.

An eighth implementation 444 depicts the faceplate accessory 104 comprising an electrophoretic display 446 and a touch sensor 322. The electrophoretic display 446 may provide persistent display of an image without ongoing refresh and associated consumption of electrical power. For example, the electrophoretic display 446 may be operated based on data received from the main unit 102 via the communication interface 208 with the main unit 102 to present a set of prompts 448 or other user interface elements. Each prompt 448 may be associated with a different resident of the dwelling that the system 100 is affixed to. For example, the button 324 may present a name, apartment number, or other information that allows a visitor to select a particular resident. The touch sensor 322 may be used to detect input indicative of the selection. Responsive to this, the system 100 may provide a notification to the user associated with that selection. For example, if a visitor arrives at a multi-tenant dwelling to see Marlin, upon pressing the button labeled "Marlin" a notification may be sent to the user device associated with Marlin, notifying him of the caller.

In one implementation each prompt 448 may be associated with a specified group. The group may comprise members such as indicated by one or more associated user accounts or identifiers. The groupings may be pre-defined or may be specified during setup. For example, groups may specify "parents", "kids", "Apt A", "Apt B", "Guests", "Delivery", and so forth. The input data 256 associated with actuation of a particular prompt 448 may be used to determine the group and associated members. For example, the input data 256 indicative of the prompt 448 may be sent to the servers 292. Based on the input data 256 and other information such as data indicative of the main unit 102 that is sending the data, the server(s) 292 may determine the corresponding group. Once the group is determined, the members of the group may be determined, and notifications sent to their respective devices. In other implementations other architectures may be used.

A ninth implementation 460 depicts the faceplate accessory 104 comprising a button 324 mounted in a housing with an NFC interface 306. The NFC interface 306 may be used to acquire data, such as from an NFC fob carried by the user in lieu of a key. In one implementation, responsive to the data provided by a valid NFC fob, an actuator may be operated to lock or unlock a door.

A tenth implementation 462 depicts the faceplate accessory 104 comprising a button 324 mounted in a housing with a fingerprint sensor 326. The fingerprint sensor 326 may be used to acquire sensor data 254 indicative of a fingerprint of a person. In one implementation, responsive to the data provided by the fingerprint sensor 326, an actuator may be operated to lock or unlock a door. In another implementation, the fingerprint sensor 326 may be used to provide a log of users entering or exiting the dwelling.

An eleventh implementation 464 depicts the faceplate accessory 104 comprising an assembly in a housing that may selectively present keypad indicia 466 or button indicia 468. The faceplate accessory 104 also includes a touch sensor 322 to determine input associated with the keypad indicia 466 and the button indicia 468. One implementation of this assembly is discussed in more detail with regard to FIGS. 5A-5B.

It is understood that the implementations described above may be combined or modified. For example, the relative placement of button 324 and display 382 with respect to the faceplate accessory 104 may be changed. Different combinations of components may be realized, such as a faceplate accessory 104 that comprises a button 324, electrophoretic display 446, and a fingerprint sensor 326.

Figure 5A:
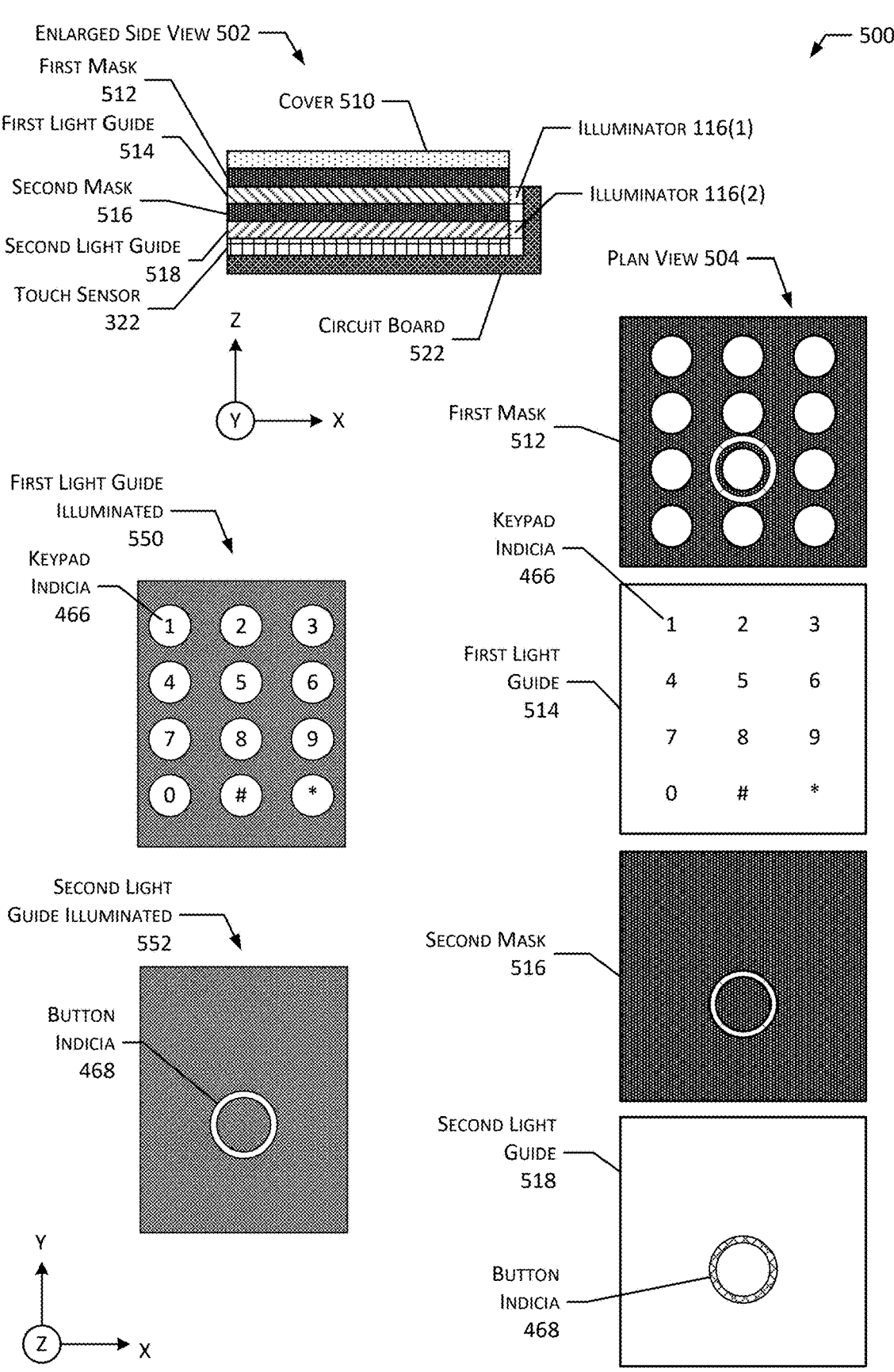
FIG. 5A illustrates a first implementation of an assembly that allows selective display of visual indicia such as a keypad at a first time, or a button indicia at a second time.

FIG. 5A illustrates at 500 one implementation of an assembly that allows selective display of visual indicia such as a keypad at a first time, or a button indicia at a second time. While a keypad and button are depicted, other indicia may be used.

An enlarged side view 502 is depicted. The vertical scale of this enlarged side view 502 has been greatly exaggerated for clarity. For example, the individual thickness of the various layers may range from 0.1 millimeter (mm) to 1 mm. Also depicted is a plan view 504 of some layers of the assembly.

The assembly may comprise a cover 510 layer. The cover 510 layer may comprise an optically transparent or translucent material. For example, the cover 510 layer may comprise glass, plastic, and so forth. In some implementations the cover 510 layer may be about 0.6 mm thick.

A first mask 512 is arranged under the cover 510 layer. A mask comprises an optically opaque material with one or more apertures or clear portions through which the underlying indicia may be presented. For example, the first mask 512 may comprise plastic with holes cut in it to allow presentation of the underlying visual indicia such as the keypad indicia 466 and the button indicia 468.

A first light guide 514 is arranged under the first mask 512. The first light guide 514 may include one or more visual indicia, such as keypad indicia 466 depicted here comprising glyphs such as the numbers 0-9, #, and *. In other implementations other visual indicia may be used. The visual indicia may be one or more of: printed on the first light guide 514, embossed into the first light guide 514, etched into the first light guide 514, and so forth.

A light guide utilizes internal reflection to distribute light provided by an associated illuminator 116 across at least a portion of the light guide. The light guide may comprise a material that is transparent for the wavelength of light being used. For example, the light guide may comprise clear glass or plastic. The light guide may contain various features, such as etching, diffraction features, light pipes, and so forth that direct or otherwise distribute the light from the associated illuminator 116.

A second mask 516 is arranged under the first light guide 514. For example, the second mask 516 may comprise plastic with holes cut in it to allow presentation of the underlying visual indicia such as the button indicia 468.

A second light guide 518 is arranged under the second mask 516. The second light guide 518 may include one or more visual indicia, such as the button indicia 468. In other implementations other visual indicia may be used.

A touch sensor 322 may be arranged under the second light guide 518. For example, the touch sensor 322 may comprise a capacitive force sensitive touch sensor. Force from a user pressing on the cover 510 may be transferred through the intervening components to the touch sensor 322, where that force is detected and registered as a touch input. In other implementations other touch sensors, switches, or other devices may be used to detect input associated with the visual indicia. In some implementations, the input determined may be based on which of the light guides are illuminated. For example, a touch input associated with the "8" as depicted in this illustration may be associated with a user input of an "8" when the first light guide 514 is illuminated, or may be associated with a "doorbell button activation" when the second light guide 518 is illuminated.

A circuit board 522 may be arranged under the touch sensor 322. The illuminators 116(1) and 116(2) may be attached to the circuit board 522. The illuminators 116(1) and 116(2) may be selectively operated to present the visual indica of a particular light guide at a given time.

A representation of the first light guide 514 being illuminated is shown at 550. At a first time a first set of illuminators 116(1) are operated to illuminate the first light guide 514, while a second set of illuminators 116(2) remain off. In this first configuration, light from the first set of illuminators 116(1) is distributed via internal reflection and other optical effects across the first light guide 514, illuminating the keypad indicia 466.

A representation of the second light guide 518 being illuminated is shown at 552. At a second time the first set of illuminators 116(1) are off, while the second set of illuminators 116(2) are operated to illuminate the second light guide 518. In this second configuration, light from the second set of illuminators 116(2) is distributed via internal reflection and other optical effects across the second light guide 518, illuminating the button indicia 468.

In other implementations, additional masks and light guides may be added to allow for the selective presentation of other visual indicia.

FIG. 5B illustrates at 570 another implementation of an assembly that allows selective display of visual indicia such as a keypad at a first time, or a button indicia at a second time. While a keypad and button are depicted, other indicia may be used.

An enlarged side view 572 is depicted. The vertical scale of this enlarged side view 572 has been greatly exaggerated for clarity. For example, the individual thickness of the various layers may range from 0.1 millimeter (mm) to 1 mm.

The assembly may comprise a cover 510 layer. The cover 510 layer may comprise an optically transparent or translucent material. For example, the cover 510 layer may comprise glass, plastic, and so forth. In some implementations the cover 510 layer may be about 0.6 mm thick.

A first mask 512 is arranged under the cover 510 layer. A mask comprises an optically opaque material with one or more apertures or clear portions through which the underlying indicia may be presented. For example, the first mask 512 may comprise plastic with holes cut in it to allow presentation of the underlying visual indicia such as the keypad indicia 466 and the button indicia 468.

A first light guide 514 is arranged under the first mask 512. The first light guide 514 may include one or more visual indicia, such as keypad indicia 466 depicted in FIG. 5A comprising glyphs such as the numbers 0-9, #, and *. In other implementations other visual indicia may be used. The visual indicia may be one or more of printed on the first light guide 514, embossed into the first light guide 514, etched into the first light guide 514, and so forth.

A light guide utilizes internal reflection to distribute light provided by an associated illuminator 116 across at least a portion of the light guide. The light guide may comprise a material that is transparent for the wavelength of light being used. For example, the light guide may comprise clear glass or plastic. The light guide may contain various features, such as etching, diffraction features, light pipes, and so forth that direct or otherwise distribute the light from the associated illuminator 116.

A second mask 516 is arranged under the first light guide 514. For example, the second mask 516 may comprise plastic with holes cut in it to allow presentation of the underlying visual indicia such as the button indicia 468.

A circuit board 574 may be arranged between the first light guide 514 and the second light guide 518. The illuminators 116(1) and 116(2) may be attached to the circuit board 574. The illuminators 116(1) and 116(2) may be selectively operated to present the visual indica of a particular light guide at a given time. In some implementations, the circuit board 574 may comprise a transparent material and be used in conjunction with the second mask 516. In other implementations, the circuit board 574 may comprise an opaque material, and may be used in addition to, or in in place of the second mask 516.

A second light guide 518 is arranged under the second mask 516. The second light guide 518 may include one or more visual indicia, such as the button indicia 468. In other implementations other visual indicia may be used.

A touch sensor 322 may be arranged under the second light guide 518. For example, the touch sensor 322 may comprise a capacitive force sensitive touch sensor. Force from a user pressing on the cover 510 may be transferred through the intervening components to the touch sensor 322, where that force is detected and registered as a touch input. In other implementations other touch sensors, switches, or other devices may be used to detect input associated with the visual indicia. In some implementations, the input determined may be based on which of the light guides are illuminated.

As described above, at a first time a first set of illuminators 116(1) are operated to illuminate the first light guide 514, while a second set of illuminators 116(2) remain off. In this first configuration, light from the first set of illuminators 116(1) is distributed via internal reflection and other optical effects across the first light guide 514, illuminating the keypad indicia 466. At a second time the first set of illuminators 116(1) are off, while the second set of illuminators 116(2) are operated to illuminate the second light guide 518. In this second configuration, light from the second set of illuminators 116(2) is distributed via internal reflection and other optical effects across the second light guide 518, illuminating the button indicia 468.

In other implementations, additional masks and light guides may be added to allow for the selective presentation of other visual indicia.

FIG. 6 is a flow diagram 600 of a process to operate the system 100, according to some implementations. The process may be implemented at least in part by one or more of the main unit 102, the faceplate accessory 104, or the one or more servers 292.

At 602 first state data indicative of a faceplate accessory 104 being coupled to the faceplate interface 150 is determined. For example, one or more of the electrical contacts 156 or the accessory mount sensor 320 may be used to determine first accessory state data 260.

At 604 communication is established with the faceplate accessory 104 using a first communication interface 208. For example, a first SPI interface 302 of the main unit 102 may communicate with a second SPI interface 302 of the faceplate accessory 104, via the electrical connection between the electrical contacts 156 and the electrical pads 170. In some implementations additional operations may be performed.

In some implementations, one or more authentication operations may be performed. For example, a mutual authentication process implementing EDHOC may be used to establish that the main unit 102 and the faceplate accessory 104 are approved to communicate with one another.

A secure connection may also be established between the main unit 102 and the faceplate accessory 104. For example, COSE may be used to encrypt the data between the main unit 102 and the faceplate accessory 104.

At 606 faceplate accessory information may be received from the faceplate accessory 104. For example, the main unit communication module 270 may send the accessory identifier data 274 to the accessory communication module 228.

At 608 the faceplate accessory 104 is operated based at least in part on the faceplate accessory information. For example, the application module 226 may determine, based on the accessory identifier data 274, that the faceplate accessory 104 includes a second camera 114 and a display 382. Based on this, the application module 226 may operate the second camera 114 to acquire image data, send output data for presentation on the display 382, and so forth.

At 610 second state data is determined that is indicative of the faceplate accessory 104 no longer being coupled to the faceplate interface 150. For example, one or more of the electrical contacts 156 or the accessory mount sensor 320 may be used to determine second accessory state data 260.

At 612 a notification is sent using a second communication interface 208 that the accessory device 104 has been removed from the accessory interface 150. For example, the main unit 102 may use the network interface 212 to send notification data indicative of the removal to the one or more servers 292. The one or more servers 292 may then send notification data to a user device that is associated with the main unit 102.

In accordance with one or more preferred implementations, an 8-pin connector is utilized for a faceplate interface 150 of a main unit 102 of a video doorbell device. In accordance with one or more preferred implementations, each pin of the 8-pin connector is connected to a corresponding line.

In accordance with one or more preferred implementations, a connector of a faceplate interface 150 of a main unit 102 includes an interrupt request (IRQ) pin connected to a corresponding IRQ line, an identification (ID) pin connected to a corresponding ID line, and a ground pin connected to a corresponding ground line. In accordance with one or more preferred implementations, at a main unit 102 of a doorbell device, a weak (e.g. relatively low resistance value) pull-down resistor is connected from the IRQ line to the ground line. In accordance with one or more preferred implementations, an 8-pin connector is utilized for a connector interface of a faceplate accessory 104. In accordance with one or more preferred implementations, each pin of the 8-pin connector is connected to a corresponding line.

In accordance with one or more preferred implementations, a connector of a connector interface of a faceplate accessory 104 includes an interrupt request (IRQ) pin connected to a corresponding IRQ line, an identification (ID) pin connected to a corresponding ID line, and a ground pin connected to a corresponding ground line.

In accordance with one or more preferred implementations, a faceplate interface 150 of a main unit 102 and a connector interface of a faceplate accessory 104 are configured as a serial communication interface (SCI). In accordance with one or more preferred implementations, each SCI may include eight pins or lines, including two data pins, a clock pin, a chip select pin, a power pin, an ID pin, a ground pin, and an IRQ pin.

In accordance with one or more preferred implementations, at a faceplate accessory 104 of a first type, the ID line is connected to the ground line, while at a faceplate accessory 104 of a second type, the ID line is not connected to the ground line. In accordance with one or more preferred implementations, a main unit 102 can determine whether a faceplate accessory 104 connected to the faceplate interface 150 of the main unit 102 is of the first type or the second type based on sampling a voltage value of its ID line, e.g. using an analog to digital converter (ADC).

In accordance with one or more preferred implementations, at a faceplate accessory 104, a power line connected to a power pin includes a resistor, and is coupled to an IRQ line at a first junction. The first junction is also coupled to the ground line by a capacitor line that includes a capacitor. Coupled in parallel to this capacitor line is a circuit that includes a capacitor and a button. The button is a front button of the faceplate accessory 104 that is configured to cause actuation of the video doorbell (e.g. effect signaling of the doorbell). This circuit is coupled to the first junction and the second junction.

In accordance with one or more preferred implementations, when a faceplate accessory 104 is installed on a main unit 102, pressing of a front button of the faceplate accessory 104 effects a logic change on the IRQ line that is detected at the main unit 102. The main unit 102 samples a voltage value on its ID line. If the sampled value corresponds to a logical zero (because of the pulled down voltage from the connection to ground), then the main unit 102 knows that a faceplate accessory 104 of a first type is attached and its front button has been pressed. Based on this, the main unit 102 powers on a camera 114, sends a message, sounds a chime, streams video, etc. If the sampled value does not correspond to a logical zero, then the main unit 102 knows that a faceplate accessory 104 of a first type is not attached and may determine that a faceplate removal event has occurred (e.g. based on previously stored data indicating that a faceplate accessory 104 of a first type was installed or based on also not determining based on data communicated over the other pins that a different type of faceplate accessory 104 is installed).

In accordance with one or more preferred implementations, when a faceplate accessory 104 comprising a microcontroller unit is installed on a main unit 102, data is communicated over one or more pins (e.g. data pins in accordance with a serial communication interface approach) representing a handshake confirming that a faceplate accessory 104 of a particular type is installed on the main unit 102. In accordance with one or more preferred implementations, when a main unit 102 receives an interrupt over an IRQ pin of a faceplate interface 150, if such a handshake does not determine that there is a faceplate accessory 104 installed, the main unit 102 may determine that a faceplate removal event has occurred (e.g. based on previously stored data indicating that a faceplate accessory 104 of a certain type was installed or based on also not determining that a sampled value from the ID line corresponds to a logical zero).

In accordance with one or more preferred implementations, a faceplate accessory 104 comprises a plurality of buttons 324 that are configured to effect operation as a doorbell. In accordance with one or more preferred implementations, each of these buttons 324 is associated with a different resident, user, person, or group. For example, in accordance with one or more preferred implementations, a system is configured such that a first button 324 effects an alert to a first set of one or more user accounts, and a second button 324 effects an alert to a second set of one or more user accounts. In accordance with one or more preferred implementations, when a button of a faceplate accessory 104 is pressed, an indication of the button 324 that was pressed is communicated from the faceplate accessory 104 to a main unit 102, and then from the main unit 102 to a remote system (e.g. via a wireless transceiver).

In accordance with one or more preferred implementations, at a faceplate accessory 104 of a third type, the ID line is connected to the ground line through a resistor having a first resistance value, while at a faceplate accessory 104 of a fourth type, the ID line is connected to the ground line through a resistor having a second resistance value. In accordance with one or more preferred implementations, a main unit 102 can determine whether a faceplate accessory 104 connected to the faceplate interface 150 of the main unit 102 is of the first type, second type, third type, or fourth type based on sampling a voltage value of its ID line, e.g. using an analog to digital converter (ADC).

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EE- PROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A video doorbell system comprising:
   a main unit comprising:
   a first camera;
   one or more microphones;
   one or more speakers;
   one or more motion sensors;
   a wireless communication interface;
   a faceplate interface comprising:
   a set of electrical contacts, and
   one or more mechanical retention features;
   a first faceplate accessory removably coupled to the main unit, the first faceplate accessory comprising:
   one or more electrical pads in contact with the set of electrical contacts,
   one or more mechanical engagement features that mechanically engage the one or more mechanical retention features,
   a touch sensor,
   an electronic ink display, and
   a display controller coupled to the electronic ink display and the one or more electrical pads;
   one or more first processors; and
   a first memory storing first computer-executable instructions that, when executed by the one or more first processors, cause the main unit to perform operations comprising:
   determining first state data that indicates the first faceplate accessory is coupled to the faceplate interface,
   processing accessory data received from the first faceplate accessory via the set of electrical contacts of the faceplate interface, and
   sending command data to the first faceplate accessory via the set of electrical contacts of the faceplate interface; and
   the first memory further storing second computer-executable instructions that, when executed by the one or more first processors, cause the main unit to perform operations comprising:

displaying one or more visual indicia using the electronic ink display.

2. The video doorbell system of claim 1, wherein the first camera has a first field of view (FOV), and the first faceplate accessory further comprising:

a button; and a second camera having a second FOV, wherein the second camera is oriented relative to the first camera such that, when the video doorbell system is oriented in a first orientation such that the first FOV extends generally horizontally, the second FOV is oriented more vertically downward relative to the first FOV.

3. The video doorbell system of claim 1, the first face late accessory further comprising:

one or more illuminators arranged and positioned such that, when the illuminators are activated and the video doorbell system is oriented in a first orientation such that a first FOV of the first camera extends generally horizontally, the illuminators produce a light pattern directed downward.

4. The video doorbell system of claim 1, the first faceplate accessory further comprising:

a cover; and a keypad, located under the cover, comprising:

a first mask;

a first light guide, under the first mask, comprising a first set of visual indicia;

a first illuminator that is optically coupled to the first light guide such that light generated by the first illuminator during operation is distributed via internal reflection through the first light guide to illuminate the first set of visual indicia;

a second mask under the first light guide;

a second light guide, under the second mask, comprising a second set of visual indicia;

a second illuminator that is optically coupled to the second light guide such that light generated by the second illuminator during operation is distributed via internal reflection through the second light guide to illuminate the second set of visual indica; and a touch sensor controller coupled to the touch sensor and the one or more electrical pads.

5. The video doorbell system of claim 1, the first faceplate accessory further comprising:

electronics connected to the one or more electrical pads, the electronics comprising:

a first set of input devices comprising one or more of: a fingerprint sensor, a near-field communication (NFC) interface, or a second camera;

a controller coupled to the first set of input devices;

one or more second processors; and a second memory storing third computer-executable instructions that, when executed by the one or more second processors, cause the first faceplate accessory to perform operations comprising:

determining input data acquired by the first set of input devices, determining, based on the input data, first data, and sending the first data to the main unit via the one or more electrical pads; and wherein the first memory further stores fourth computer-executable instructions that, when executed by the one or more first processors, cause the main unit to perform operations comprising:

receiving the first data; and operating the main unit based on the first data.

6. The video doorbell system of claim 1, wherein the first memory stores third computer-executable instructions that, when executed by the one or more first processors, cause the main unit to perform operations comprising:

determining at least one contact of the set of electrical contacts has lost connection with the one or more electrical pads on the first faceplate accessory;

determining second state data that indicates the first faceplate accessory is not coupled to the faceplate interface; and sending a notification that the first faceplate accessory has been removed from the faceplate interface using the wireless communication interface.

7. A computer-implemented method comprising:

determining, at a first device, first state data that indicates a faceplate accessory is coupled to a faceplate interface;

receiving, at the first device, first data using a first communication interface that is associated with the faceplate interface;

authenticating, at the first device, the faceplate accessory based on the first data;

establishing a secure connection between the first device and the faceplate accessory using the first communication interface;

operating the faceplate accessory;

acquiring, at the first device, first sensor data using a first sensor;

determining, at the first device, presence of an object based on the first sensor data;

responsive to the determining the presence of the object, generating an interrupt signal;

sending the interrupt signal from the first device to the faceplate accessory using the first communication interface; and responsive to the interrupt signal, transitioning one or more electronic devices of the faceplate accessory from a first operating mode to a second operating mode, wherein the second operating mode consumes more electrical power than the first operating mode.

8. The computer-implemented method of claim 7, further comprising:

receiving, at the first device, second data using the secure connection;

determining, at the first device, a doorbell input event based on the second data; and sending, using a second communication interface of the first device, third data indicative of the doorbell input event.

9. The computer-implemented method of claim 7, further comprising:

determining second state data that indicates the faceplate accessory is no longer coupled to the faceplate interface;

discontinuing the secure connection with the faceplate accessory; and sending, using a second communication interface of the first device, second data indicative of removal of the faceplate accessory.

10. The computer-implemented method of claim 7, further comprising:

acquiring second data using one or more devices of the faceplate accessory;

encrypting the second data at the faceplate accessory to determine encrypted data;

sending, via the secure connection, the encrypted data from the faceplate accessory;

receiving, via the secure connection, the encrypted data;

sending, using a second communication interface, the encrypted data;

receiving, using the second communication interface, third data; and responsive to the third data, operating the faceplate accessory using the secure connection.

11. The computer-implemented method of claim 7, further comprising:

sending, from the first device to the faceplate accessory via the secure connection, second data that is representative of data to present on a display device of the faceplate accessory;

receiving, via the secure connection, the second data at the faceplate accessory; and responsive to the second data, operating the display device of the faceplate accessory.

12. An electronic device comprising:

a camera;

a microphone;

a speaker;

a first communication interface comprising:

a set of electrical contacts, and one or more mechanical retention features;

a faceplate interface;

one or more processors;

one or more computer readable media storing first instructions that, when executed by the one or more processors, cause the electronic device to perform operations comprising:

determining first state data indicative of a faceplate accessory being coupled to the faceplate interface, establishing communication with the faceplate accessory using the first communication interface, receiving first data from the faceplate accessory, and operating the faceplate accessory based at least on the first data; and the faceplate accessory comprising:

one or more electrical pads in contact with the set of electrical contacts, one or more mechanical engagement features that engage the one or more mechanical retention features, a cover, and a keypad, located under the cover, comprising:

a first mask, a first light guide, under the first mask, comprising a first set of visual indicia, a first illuminator that is optically coupled to the first light guide such that light generated by the first illuminator during operation is distributed via internal reflection through the first light guide to illuminate the first set of visual indicia, a second mask under the first light guide, a second light guide, under the second mask, comprising a second set of visual indicia, a second illuminator that is optically coupled to the second light guide such that light generated b the second illuminator during operation is distributed via internal reflection through the second light guide to illuminate the second set of visual indica, a touch sensor, and a touch sensor controller coupled to the touch sensor and the one or more electrical pads.

13. The electronic device of claim 12, wherein the one or more computer readable media further stores second instructions that, when executed by the one or more processors, cause the electronic device to perform operations comprising:

determining second state data indicative of the faceplate accessory no longer being coupled to the faceplate interface, and sending a notification indicative of removal of the faceplate accessory using a second communication interface.

14. The electronic device of claim 12, wherein the one or more computer readable media further stores second instructions that, when executed by the one or more processors, cause the electronic device to perform operations comprising:

authenticating the faceplate accessory based on the first data.

15. The electronic device of claim 12, wherein the one or more computer readable media further stores second instructions that, when executed by the one or more processors, cause the electronic device to perform operations comprising:

receiving second data, determining a doorbell input event based on the second data, and sending third data indicative of the doorbell input event.

16. The electronic device of claim 12, wherein the electronic device comprises an infrared light source.

17. The electronic device of claim 12, wherein the electronic device comprises a passive infrared sensor.

18. A video doorbell system comprising:

a main unit comprising:

a first camera;

one or more microphones;

one or more speakers;

one or more motion sensors;

a wireless communication interface;

a faceplate interface comprising:

a set of electrical contacts, and one or more mechanical retention features;

one or more first processors; and a first memory storing first computer-executable instructions that, when executed by the one or more first processors, cause the main unit to perform operations comprising:

determining first state data that indicates a faceplate accessory is coupled to the faceplate interface, processing accessory data received from the faceplate accessory via the set of electrical contacts of the faceplate interface, and sending command data to the faceplate accessory via the set of electrical contacts of the faceplate interface; and the faceplate accessory removably coupled to the main unit, the faceplate accessory comprising:

one or more electrical pads in contact with the set of electrical contacts;

one or more mechanical engagement features that engage the one or more mechanical retention features; and electronics connected to the one or more electrical pads, the electronics comprising:

a first set of input devices comprising one or more of: a fingerprint sensor, a near-field communication (NFC) interface, or a second camera;

a controller coupled to the first set of input devices;

one or more second processors; and a second memory storing second computer-executable instructions that, when executed by the one or more second processors, cause the faceplate accessory to perform operations comprising:

determining input data acquired by the first set of input devices, determining, based on the input data, first data, and sending the first data to the main unit via the one or more electrical pads; and wherein the first memory stores third computer-executable instructions that, when executed by the one or more first processors, cause the main unit to perform operations comprising:

receiving the first data; and operating the main unit based on the first data.

19. The video doorbell system of claim 18, wherein the first camera has a first FOV, and the faceplate accessory further comprising:

a button; and wherein the second camera has a second FOV, wherein the second camera is oriented relative to the first camera such that, when the video doorbell system is oriented in a first orientation such that the first FOV extends generally horizontally, the second FOV is oriented more vertically downward relative to the first FOV.

20. The video doorbell system of claim 18, the faceplate accessory further comprising:

one or more illuminators arranged and positioned such that, when the illuminators are activated and the video doorbell system is oriented in a first orientation such that a first FOV of the first camera extends generally horizontally, the illuminators produce a light pattern directed downward.

* * * * *